US008725744B2

(12) United States Patent  (10) Patent No.: US 8,725,744 B2
Setlur  (45) Date of Patent: May 13, 2014

(54) METHOD, APPARATUS AND COMPUTER PROGRAM PRODUCT FOR VISUALLY GROUPING RELATIONSHIPS FROM DATABASES

(75) Inventor: Vidya Raghavan Setlur, Portola Valley, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/436,095

(22) Filed: Mar. 30, 2012

(65) Prior Publication Data

US 2013/0257872 A1  Oct. 3, 2013

(51) Int. Cl.
*G06F 7/00* (2006.01)
(52) U.S. Cl.
USPC .......................................................... 707/752
(58) Field of Classification Search
USPC .......................................................... 707/752
See application file for complete search history.

(56) References Cited

U.S. PATENT DOCUMENTS

| 7,380,217 | B2 | 5/2008 | Gvelesiani | |
|---|---|---|---|---|
| 7,685,141 | B2 | 3/2010 | Jadhav et al. | |
| 2002/0078003 | A1* | 6/2002 | Krysiak et al. | 707/1 |
| 2005/0102309 | A1* | 5/2005 | Tully | 707/102 |
| 2008/0270458 | A1 | 10/2008 | Gvelesiani | |
| 2011/0078136 | A1 | 3/2011 | Ronen et al. | |
| 2011/0184983 | A1 | 7/2011 | Kwantes et al. | |
| 2011/0307460 | A1 | 12/2011 | Vadlamani et al. | |

FOREIGN PATENT DOCUMENTS

WO  WO 2009/042267 A1  4/2009
WO  WO 2011/020880 A1  2/2011

OTHER PUBLICATIONS

Chittaro, L; Visualizing information on mobile devices:; Computer 39, 3 (2006), 40-45.
Karstens, B.; "Visualization of complex structures on mobile handhelds"; Proceedings of International Workshop on Mobile Computing (2003), 17-18.
Hao, J., and Zhang, K.A.; "A mobile interface for hierarchical information visualization and navigation"; Consumer Electronics, 2007; ISCE 2007; International Symposium on, IEEE (2007), 1-7.
Pattath, A., Ebert, D.S., May, R.A., Collins, T.F., and Pike, W.; "Real-time scalable visual analysis on mobile devices"; R. Creutzburg and J.H. Takala, Eds., vol. 6821, SPIE (2008), 682102.

* cited by examiner

*Primary Examiner* — Truong Vo
(74) *Attorney, Agent, or Firm* — McClure and Associates, PLLC

(57) ABSTRACT

Provided herein is a method, apparatus and computer program product for providing a visual representation of relationships between information entities from databases. In particular, the method may include identifying a plurality of entities with a primary relationship with a root entity, and a plurality of entities with a secondary relationship with the root entity, display of the root entity, a first subset of the plurality of entities with a primary relationship with the root entity, and a first subset of the plurality of entities with a secondary relationship with the root entity. Methods may further include display of an indication that the first subset of entities with a primary relationship has a primary relationship with the root entity and providing for display of an indication that the first subset of entities with a secondary relationship has a secondary relationship with the root entity.

20 Claims, 7 Drawing Sheets

METHOD, APPARATUS AND COMPUTER PROGRAM PRODUCT FOR VISUALLY GROUPING RELATIONSHIPS FROM DATABASES

TECHNOLOGICAL FIELD

Example embodiments of the present invention relate generally to the presentation of information on a display, and more particularly, to a method and computer program product for providing a visual representation of relationships between groups of information from databases.

BACKGROUND

The ubiquity of information networks, such as the Internet, has enabled access to large volumes of information and the ever-decreasing cost of digital information storage has perpetuated the substantially permanent archiving of existing information, resulting in ever growing databases of information and data. The size and number of databases of information continue to grow at exponential rates as more information is continually added and new databases are generated.

Advancements in mobile device technology have developed mobile devices, such as cellular telephones and portable digital assistants (PDAs), that have increased capabilities and provide a user with greater access and control of information. Users of such devices may be able to access networks that provide access to the massive amounts of data and information that are stored in network accessible databases. Accessing and sorting through the available data may be cumbersome, particularly on smaller, more portable devices. The portability of such devices may be enhanced by reducing their size, and hence, their display size, which may inhibit or hinder a user's ability to efficiently sort through large amounts of data in search of a particular item of interest.

SUMMARY

In general, an example embodiment of the present invention provides a method for providing a visual indication of relationships between information entities from databases. In particular, the method of example embodiments may include identifying a plurality of entities with a primary relationship with a root entity, identifying a plurality of entities with a secondary relationship with the root entity, providing for display of the root entity, a first subset of the plurality of entities with a primary relationship with the root entity, and a first subset of the plurality of entities with a secondary relationship with the root entity. Methods may further include providing for display of an indication that the first subset of the plurality of entities with a primary relationship with the root entity has a primary relationship with the root entity and providing for display of an indication that the first subset of the plurality of entities with a secondary relationship with the root entity has a secondary relationship with the root entity. Methods may also include providing for display of an indication of a relationship between at least one entity of the first subset of the plurality of entities with a primary relationship with the root entity and at least one entity of the first subset of the plurality of entities with a secondary relationship with the root entity. The indication of a relationship between the at least one entity of the first subset of the plurality of entities with a primary relationship with the root entity and the at least one entity of the first subset of entities with a secondary relationship with the root entity includes a connector.

According to example embodiments, the provision of a display of an indication of a relationship between at least one entity, of the first subset of the plurality of entities with a primary relationship with the root entity, and at least one entity, of the first subset of the plurality of entities with a secondary relationship with the root entity, includes: providing for display of an icon proximate a first entity of the first subset of the plurality of entities with a primary relationship with the root entity. The icon of this embodiment includes a representation of the first subset of the plurality of entities with a secondary relationship with the root entity. The icon of this embodiment also distinguishes the location of entities, within the representation of the first subset of the plurality of entities with a secondary relationship with the root entity, that are related to the first entity.

Methods according to example embodiments may further include providing for display of the root entity, a second subset of the plurality of entities with a primary relationship with the root entity, and the first subset of the plurality of entities with a secondary relationship with the root entity. In this embodiment, the second subset, of the plurality of entities with a primary relationship with the root entity, is displayed in response to a user input. The method of this embodiment also provides for display of an indication of a relationship between at least one entity, of the second subset of the plurality of entities with a primary relationship with the root entity, and at least one entity, of the first subset of the plurality of entities with a secondary relationship with the root entity.

Methods of example embodiments may include replacing the first subset, of the plurality of entities with a secondary relationship with the root entity, with a second subset, of the plurality of entities with a secondary relationship with the root entity, in response to a user input. The method of this embodiment may also replace the indication of a relationship between at least one entity of the first subset, of the plurality of entities with a primary relationship with the root entity, and at least one entity of the first subset, of the plurality of entities with a secondary relationship with the root entity, with an indication of a relationship between at least one entity, of the first subset of the plurality of entities with a primary relationship with the root entity, and at least one entity, of the second subset of the plurality of entities with a secondary relationship with the root entity.

According to methods of example embodiments, providing for display of an indication that the first subset of the plurality of entities with a primary relationship with the root entity, has a primary relationship with the root entity includes providing for display of the first subset, of the plurality of entities with a primary relationship with the root entity in a first area of the display. In this embodiment, providing for display of an indication that the first subset, of the plurality of entities with a secondary relationship with the root entity, has a secondary relationship with the root entity includes providing for display of the first subset of the plurality of entities with a secondary relationship with the root entity in a second area of the display. The first area of the display may be positioned between the second area of the display and the root entity.

Example embodiments of the invention may provide an apparatus including at least one processor and at least one memory including computer program code. The at least one memory and the computer program code are configured to, with the at least one processor, cause the apparatus to identify a plurality of entities with a primary relationship with a root entity, identify a plurality of entities with a secondary relationship with the root entity, and provide for display of the root entity, a first subset of the plurality of entities with a primary relationship with the root entity, and a first subset of the plurality of entities with a secondary relationship with the root entity. The apparatus may further be caused to provide for display of an indication that the first subset, of the plurality of entities with a primary relationship with the root entity, has a primary relationship with the root entity, provide for display of an indication that the first subset, of the plurality of entities with a secondary relationship with the root entity, has a secondary relationship with the root entity, and provide for display of an indication of a relationship between at least one entity of the first subset, of the plurality of entities with a primary relationship with the root entity, and at least one entity of the first subset of the plurality of entities with a secondary relationship with the root entity. The indication of a relationship between the at least one entity of the first subset of the plurality of entities with a primary relationship with the root entity, and the at least one entity, of the first subset of entities with a secondary relationship with the root entity, includes a connector.

An apparatus according to example embodiments may further be caused to provide for display of an indication of a relationship between at least one entity, of the first subset of the plurality of entities with a primary relationship with the root entity, and at least one entity, of the first subset of the plurality of entities with a secondary relationship with the root entity, by causing the apparatus to provide for display of an icon proximate a first entity of the first subset of the plurality of entities with a primary relationship with the root entity. In this embodiment, the icon includes a representation of the first subset of the plurality of entities with a secondary relationship with the root entity. The icon of this embodiment also distinguishes the location of entities, within the representation of the first subset of the plurality of entities with a secondary relationship with the root entity, that are related to the first entity.

An apparatus according to example embodiments may further be caused to provide for display of the root entity, a second subset of the plurality of entities with a primary relationship with the root entity, and the first subset of the plurality of entities with a secondary relationship with the root entity. The second subset of the plurality of entities with a primary relationship with the root entity, may be displayed in response to a user input. The apparatus of this embodiment may also be caused to provide for display of an indication of a relationship between at least one entity, of the second subset of the plurality of entities with a primary relationship with the root entity, and at least one entity, of the first subset of the plurality of entities with a secondary relationship with the root entity.

An apparatus according to example embodiments may further be caused to replace the first subset, of the plurality of entities with a secondary relationship with the root entity, with a second subset, of the plurality of entities with a secondary relationship with the root entity, in response to a user input. The apparatus of this embodiment may also be configured to replace the indication of a relationship between at least one entity, of the first subset of the plurality of entities with a primary relationship with the root entity, and at least one entity, of the first subset of the plurality of entities with a secondary relationship with the root entity, with an indication of a relationship between at least one entity, of the first subset of the plurality of entities with a primary relationship with the root entity, and at least one entity, of the second subset of the plurality of entities with a secondary relationship with the root entity.

The apparatus of example embodiments may be caused to provide for display of an indication that the first subset of the plurality of entities with a primary relationship with the root entity has a primary relationship with the root entity, by causing the apparatus to provide for display of the first subset, of the plurality of entities with a primary relationship with the root entity, in a first area of the display. In this embodiment, the apparatus may be caused to provide for display of an indication that the first subset, of the plurality of entities with a secondary relationship with the root entity, has a secondary relationship with the root entity by causing the apparatus to provide for display of the first subset, of the plurality of entities with a secondary relationship with the root entity, in a second area of the display. The first area of the display may be positioned between the second area of the display and the root entity.

Embodiments of the present invention may provide a computer program product including at least one non-transitory, computer-readable storage medium having computer executable program code instructions stored therein. The computer executable program code instructions may include program code instructions for identifying a plurality of entities with a primary relationship with a root entity, program code instructions for identifying a plurality of entities with a secondary relationship with the root entity, program code instructions for providing for display of the root entity, a first subset of the plurality of entities with a primary relationship with the root entity, and a first subset of the plurality of entities with a secondary relationship with the root entity. The computer program product may further include program code instructions for providing for display of an indication that the first subset, of the plurality of entities with a primary relationship with the root entity, has a primary relationship with the root entity, program code instructions for providing for display of an indication that the first subset, of the plurality of entities with a secondary relationship with the root entity, has a secondary relationship with the root entity, and program code instructions for providing for display of an indication of a relationship between at least one entity of the first subset of the plurality of entities with a primary relationship with the root entity, and at least one entity of the first subset of the plurality of entities with a secondary relationship with the root entity. The indication of a relationship between the at least one entity, of the first subset of the plurality of entities with a primary relationship with the root entity, and the at least one entity, of the first subset of entities with a secondary relationship with the root entity, includes a connector.

In some embodiments, the program code instructions for providing for display of an indication of a relationship between at least one entity, of the first subset of the plurality of entities with a primary relationship with the root entity, and at least one entity, of the first subset of the plurality of entities with a secondary relationship with the root entity, includes program code instructions for providing for display of an icon proximate a first entity of the first subset of the plurality of entities with a primary relationship with the root entity. The icon of this embodiment includes a representation of the first subset of the plurality of entities with a secondary relationship with the root entity. In this embodiment, the icon distinguishes the location of entities, within the representation of the first subset of the plurality of entities with a secondary relationship with the root entity, that are related to the first entity.

A computer program product according to example embodiments may further include program code instructions for providing for display of the root entity, a second subset of the plurality of entities with a primary relationship with the root entity, and the first subset of the plurality of entities with a secondary relationship with the root entity, where the second subset, of the plurality of entities with a primary relationship with the root entity, is displayed in response to a user input. The computer program product of this embodiment also includes program code instructions for providing for display of an indication of a relationship between at least one entity, of the second subset of the plurality of entities with a primary relationship with the root entity, and at least one entity, of the first subset of the plurality of entities with a secondary relationship with the root entity.

A computer program product according to example embodiments may further include program code instructions for replacing the first subset of the plurality of entities with a secondary relationship with the root entity, with a second subset, of the plurality of entities with a secondary relationship with the root entity, in response to a user input. The computer program product of this embodiment may also include program code instructions for replacing the indication of a relationship between at least one entity, of the first subset of the plurality of entities with a primary relationship with the root entity, and at least one entity, of the first subset of the plurality of entities with a secondary relationship with the root entity, with an indication of a relationship between at least one entity, of the first subset of the plurality of entities with a primary relationship with the root entity, and at least one entity, of the second subset of the plurality of entities with a secondary relationship with the root entity.

According to example embodiments, the program code instructions for providing for display of an indication that the first subset, of the plurality of entities with a primary relationship with the root entity has a primary relationship with the root entity, may include program code instructions for providing for display of the first subset of the plurality of entities, with a primary relationship with the root entity, in a first area of a display. In this embodiment, the program code instructions for providing for display of an indication that the first subset, of the plurality of entities with a secondary relationship with the root entity, has a secondary relationship with the root entity may also include program code instructions for providing for display of the first subset, of the plurality of entities with a secondary relationship with the root entity, in a second area of a display.

An apparatus according to example embodiments may further include means for identifying a plurality of entities with a primary relationship with a root entity, means for identifying a plurality of entities with a secondary relationship with the root entity, and means for providing for display of the root entity, a first subset of the plurality of entities with a primary relationship with the root entity, and a first subset of the plurality of entities with a secondary relationship with the root entity. The apparatus may further include means for providing for display of an indication that the first subset, of the plurality of entities with a primary relationship with the root entity, has a primary relationship with the root entity, means for providing for display of an indication that the first subset, of the plurality of entities with a secondary relationship with the root entity, has a secondary relationship with the root entity, and means for providing for display of an indication of a relationship between at least one entity of the first subset, of the plurality of entities with a primary relationship with the root entity, and at least one entity of the first subset of the plurality of entities with a secondary relationship with the root entity. The indication of a relationship between the at least one entity of the first subset of the plurality of entities with a primary relationship with the root entity, and the at least one entity, of the first subset of entities with a secondary relationship with the root entity, may include a connector.

According to example embodiments, the means for providing for display of an indication of a relationship between at least one entity, of the first subset of the plurality of entities with a primary relationship with the root entity, and at least one entity, of the first subset of the plurality of entities with a secondary relationship with the root entity may include means for providing for display of an icon proximate a first entity of the first subset of the plurality of entities with a primary relationship with the root entity. The icon of this embodiment includes a representation of the first subset of the plurality of entities with a secondary relationship with the root entity. In this embodiment, the icon distinguishes the location of entities, within the representation of the first subset of the plurality of entities with a secondary relationship with the root entity, that are related to the first entity.

An apparatus according to example embodiments may further include means for providing for display of the root entity, a second subset of the plurality of entities with a primary relationship with the root entity, and the first subset of the plurality of entities with a secondary relationship with the root entity. In this embodiment, the second subset of the plurality of entities with a primary relationship with the root entity, is displayed in response to a user input. The apparatus of this embodiment may also include means for providing for display of an indication of a relationship between at least one entity, of the second subset of the plurality of entities with a primary relationship with the root entity, and at least one entity, of the first subset of the plurality of entities with a secondary relationship with the root entity.

An apparatus according to example embodiments may further include means for replacing the first subset, of the plurality of entities with a secondary relationship with the root entity, with a second subset, of the plurality of entities with a secondary relationship with the root entity, in response to a user input. The apparatus of this embodiment also includes means for replacing the indication of a relationship between at least one entity, of the first subset of the plurality of entities with a primary relationship with the root entity, and at least one entity, of the first subset of the plurality of entities with a secondary relationship with the root entity, with an indication of a relationship between at least one entity, of the first subset of the plurality of entities with a primary relationship with the root entity, and at least one entity, of the second subset of the plurality of entities with a secondary relationship with the root entity.

Example embodiments of an apparatus may further include means for providing for display of an indication that the first subset of the plurality of entities with a primary relationship with the root entity has a primary relationship with the root entity, including means for providing for display of the first subset, of the plurality of entities with a primary relationship with the root entity, in a first area of the display. In this embodiment, the means for providing for display of an indication that the first subset, of the plurality of entities with a secondary relationship with the root entity, has a secondary relationship with the root entity includes means for providing for display of the first subset, of the plurality of entities with a secondary relationship with the root entity, in a second area of the display. The first area of the display may be positioned between the second area of the display and the root entity.

BRIEF DESCRIPTION OF THE SEVERAL
VIEWS OF THE DRAWINGS

Having thus described embodiments of the invention in general terms, reference will now be made to the accompanying drawings, which are not necessarily drawn to scale, and wherein:

Figure 6:
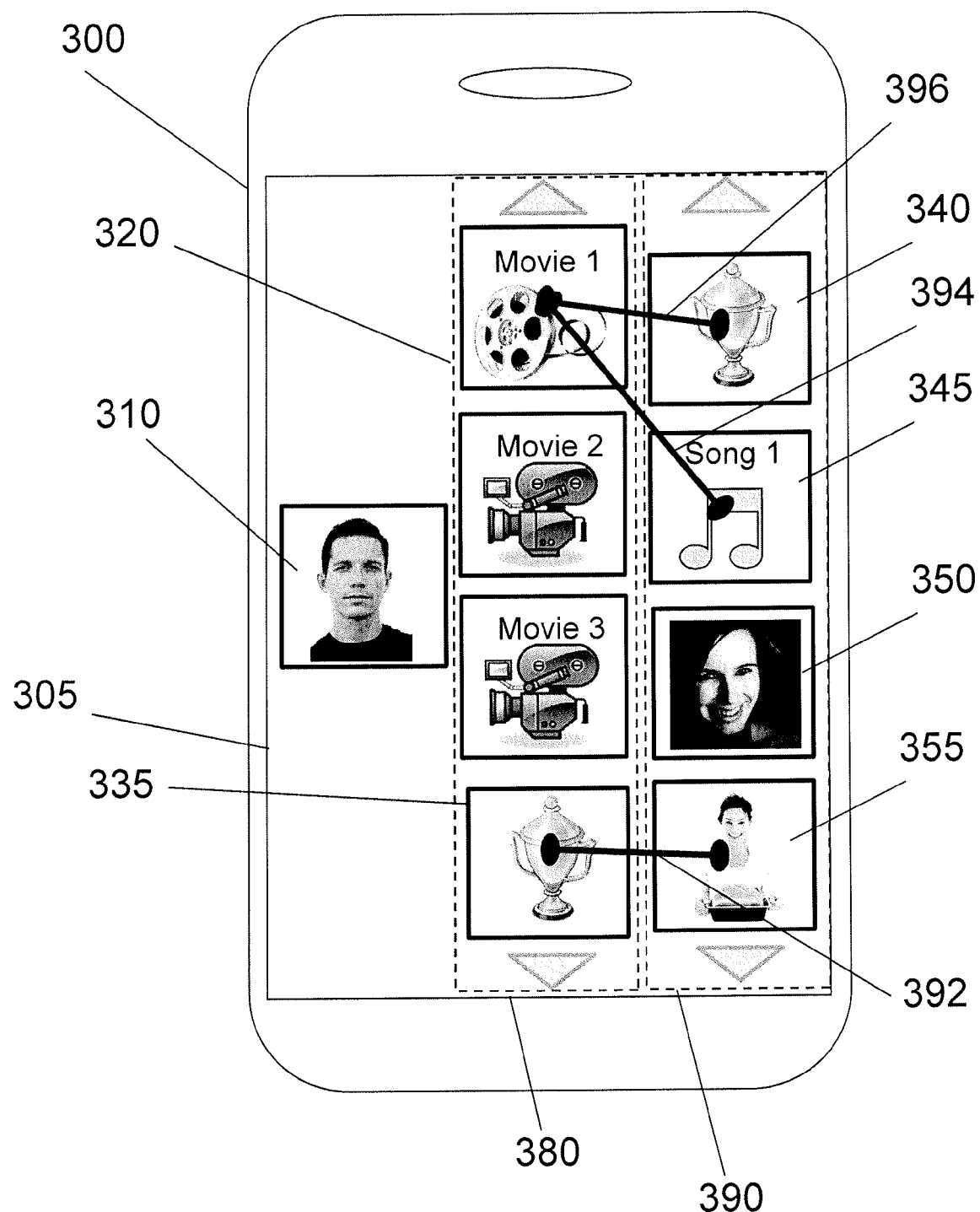
Figure 7:
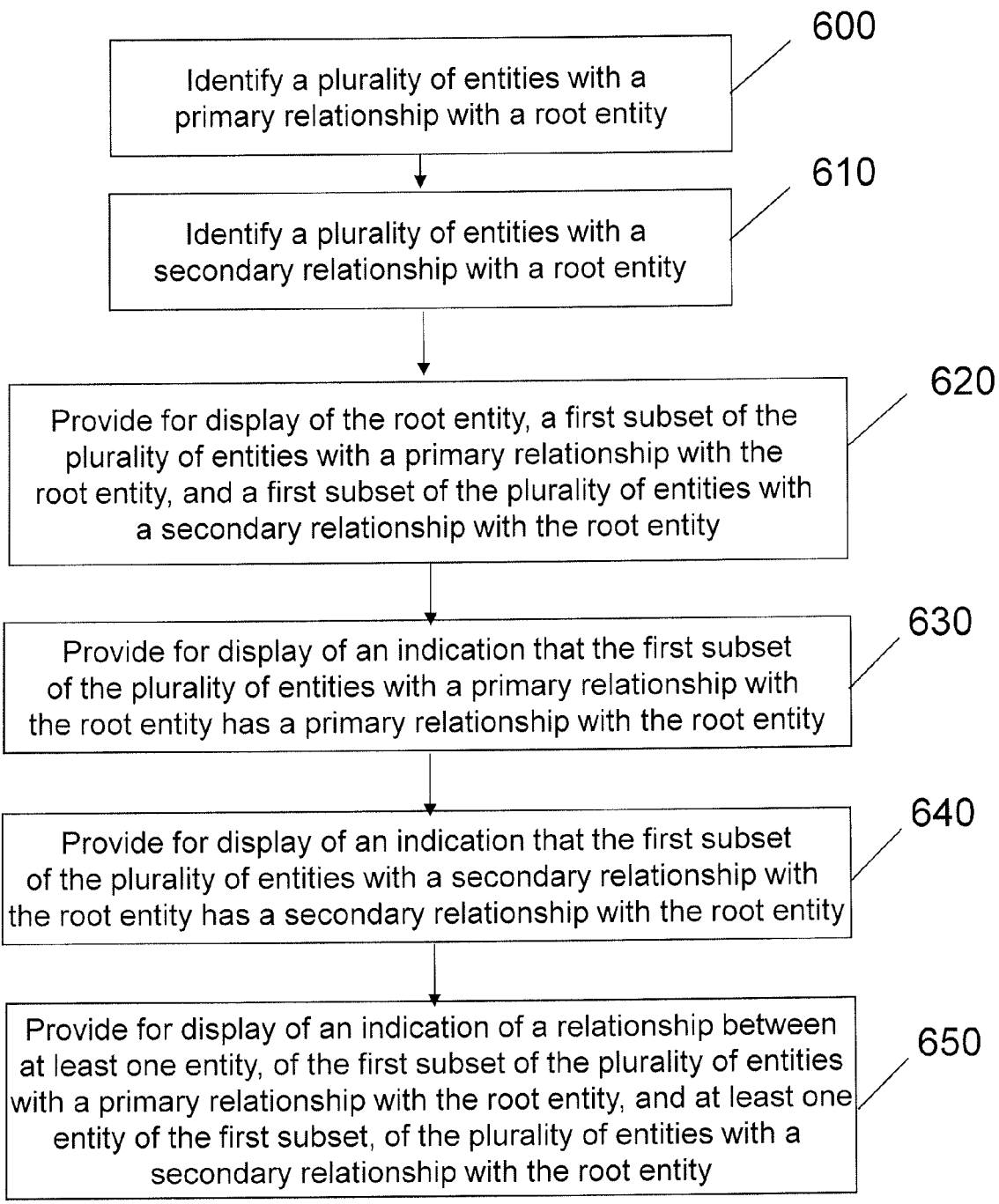

FIG. 6 illustrates a device displaying a locality of a database and illustrating relationships between information entities within the locality according to another example embodiment of the present invention; and FIG. 7 is a flowchart of an example method for displaying a locality of a database and illustrating relationships between information entities within the locality according to an embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable devices, such as tablet computers, laptop computers, cellular telephones, PDAs, portable media devices, or the like, which are enhanced by a graphical user interface presented on a display. Embodiments of the present invention may further be implemented on any device which provides for display of information such as the results of a database search. As the volume of information available on many databases can be very large, it may be desirable to have a mechanism to view and sort through information that results from a search. Particularly in databases containing relational information, where information contained within the database comprises relationships with other information within the database, it may be desirable to provide a visual illustration of the relationships between information entities when presenting the information to a user.

Some embodiments of the present invention may relate to a provision of a mechanism by which a user is presented with a plurality of information entities related to a root entity from a database containing relational information where the plurality of information entities are presented in an easily accessible, sortable, and intuitive manner. The root entity may be a search target or an information entity otherwise selected by a user. The display of the plurality of information entities related to the root entity may further include information regarding the relationships between the information entities displayed.

Figure 1:
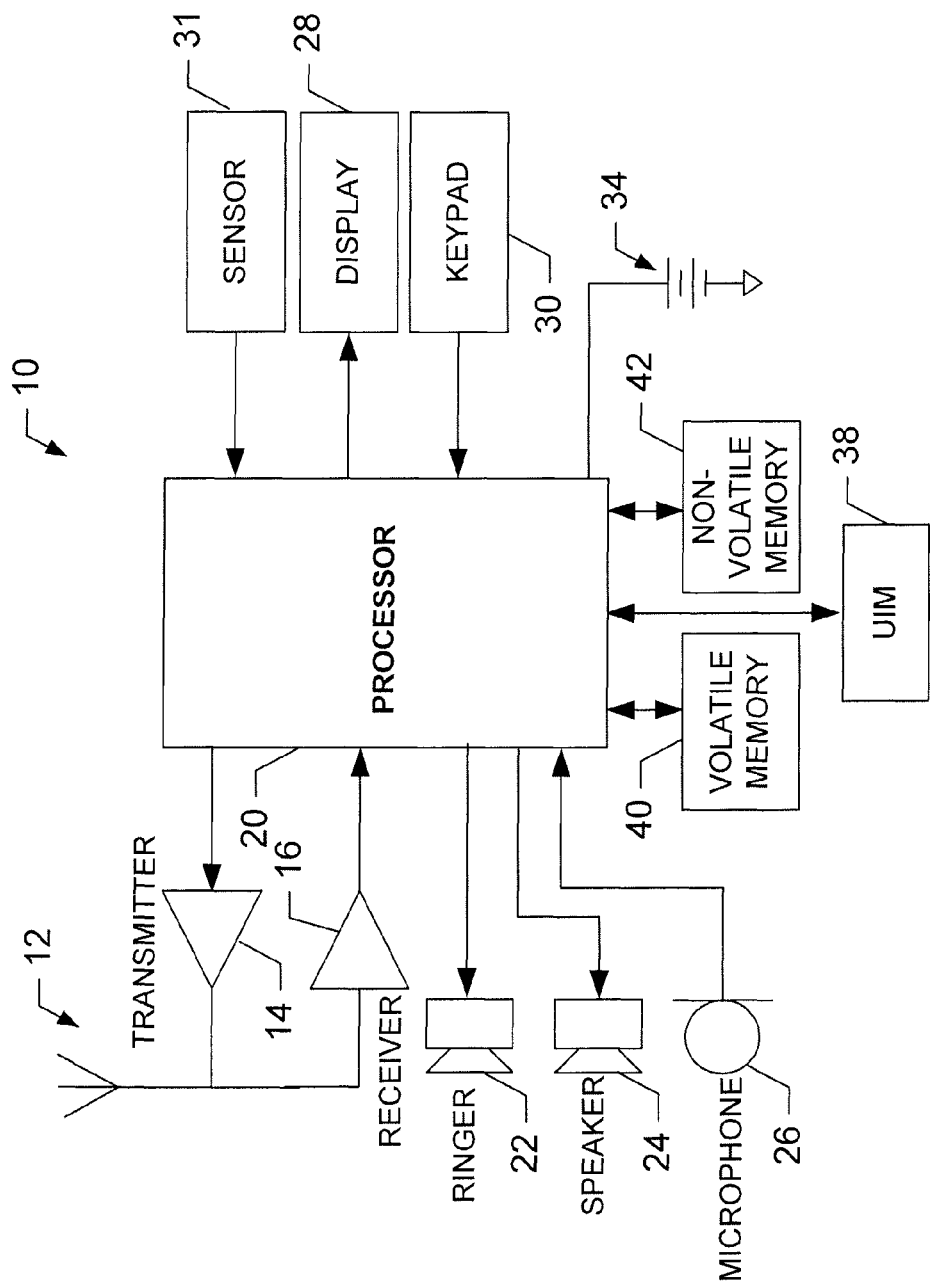
FIG. 1 is a schematic block diagram of a mobile terminal according to an example embodiment of the present invention.

One example embodiment of the invention is depicted in FIG. 1 which illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the present invention will now be described with reference to FIG. 2, in which certain elements of an apparatus 50 for providing a mechanism by which relevant content may be determined and/or presented are illustrated. The apparatus 50 of FIG. 2 may be embodied by a device such as mobile terminal 10 of FIG. 1. However, it should be noted that other embodiments of the present invention may be embodied on any number of devices. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

Figure 2:
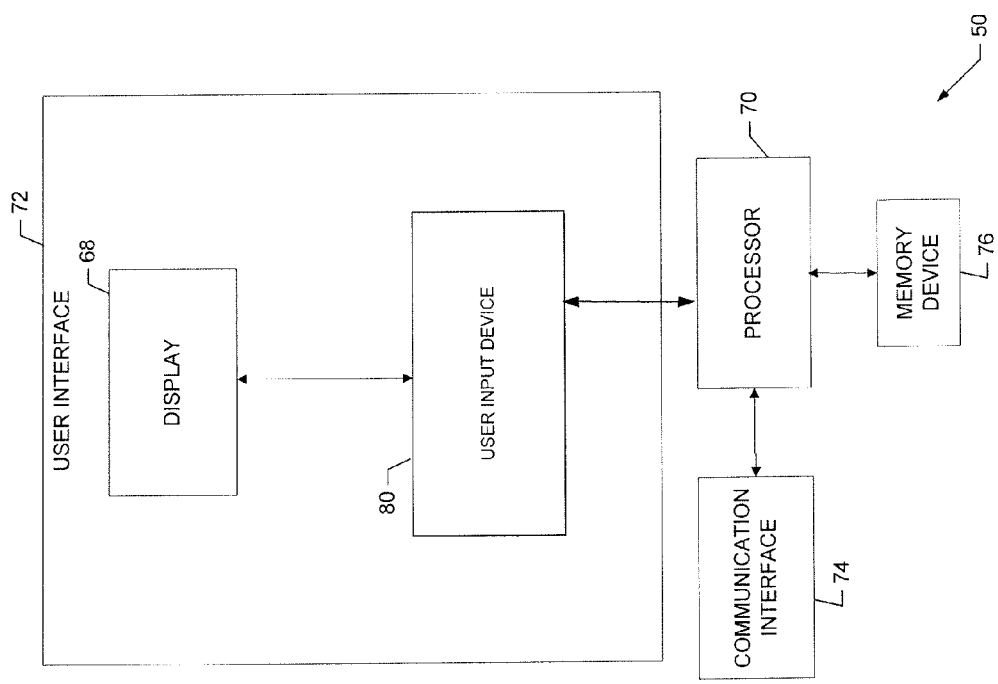
FIG. 2 is a schematic block diagram of an apparatus for providing a visual indication of relationships between information entities from databases according to an example embodiment of the present invention.

The apparatus 50 of FIG. 2 includes a processor 70 that may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, such as the illustrated display 68. In different example cases, the display 68 may include a touch screen display which may be a two dimensional (2D) or three dimensional (3D) display. Thus, for example, a touch screen display could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with a touch screen display to receive indications of user inputs at the touch screen display and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include a user input device 80, such as a keypad, a track-ball, a mouse, or the user input device may be embodied with the display 68 as a touch screen display. The user input device 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of an input received at the user input device 80 as described herein. Thus, in examples in which software is employed, a device or circuitry (e.g., the processor 70 in one example) executing the software forms the structure associated with such means.

Example embodiments of the apparatus 50 may be configured to receive a root entity and identify a plurality of entities related to the root entity within one or more databases which may be accessed through a network (e.g., via the communications interface 74) or locally (e.g., in memory device 76). The database(s) may contain information entities (items of information) that are related to one another, or "relational information." Databases containing relational information have proliferated as they can provide useful and relevant content to users. The number of relational databases has created a growing interest in leveraging relevant, high quality information present in these databases.

Devices, such as apparatus 50, have given users opportunities to access relational databases at virtually anytime from virtually any location, which has increased the community of network users that access the network and the information thereon. The information contained in relational databases is becoming more important and prevalent in searching, sharing, expressing, and exchanging information. As the amount of information available through such relational databases increases, the amount of information that must be sorted through to find the most relevant information for a user becomes more cumbersome and less efficient. It may be desirable to help users avoid combing through a morass of irrelevant content to find the information most relevant to their needs. Increasing the efficiency with which a user may access information in a relational database may increase the popularity of a relational database and enhance the user experience when accessing the information contained therein.

Generally, a method for retrieving information by a search may include systematic retrieval, where the needs of a user are described in a formal query and a database management system may retrieve the data according to the formal search query. Such systematic retrieval may not provide the user with the most relevant results as the user may not be familiar with the principles employed by the system to organize data (e.g., the data model) or the definition (e.g., schema) of the particular database to be accessed. Often the user has only a vague retrieval target (e.g., searching for something that is of interest or suitable) or the user may not provide sufficient information in the search query to return accurate and concise results.

Embodiments of the present invention provide a mechanism for grouping and graphically depicting entities (e.g., items of information) and relationships there between from databases. Example embodiments may use a weighting algorithm to order or arrange entities and provide a unique way of automatically creating visual layouts of entity nodes (e.g., representations of the entities or tiles as illustrated in embodiments described below). Relationships between entities may be classified by their degree, connectivity, cardinality, direction, type, and existence, among others. The degree of a relationship may be the number of entities associated with the relationship. The connectivity of a relationship may describe the mapping of associated entity instances in the relationship. The cardinality of a relationship may be the actual number of related occurrences for each of two entities. The direction of a relationship may indicate the originating entity of a binary relationship. These relationships may be graphically represented in an entity-relationship diagram (E-R diagram) established from an entity-relationship model.

Relationships between information entities of a database may be defined by the type of database or the information contained in the database. For example, in a database of music tracks, the entity may be an individual music track that includes a title, album, artist, track length, genre, etc. Each entity, or music track in the instant example, may be related to other music tracks, for example, music tracks from the same album are related, music tracks from the same artist are related, and music tracks of the same genre are related.

Due to the large size of many relational databases, each entity may include a plethora of relationships. It may be desirable to organize the entities of the results of a search according to a hierarchy or weight of their relationships. According to example embodiments, a weighting algorithm may be applied to entities of the database to provide search results where the entities are arranged in order of most relevant to least relevant. The weighting algorithm may afford weights to relationships between any two given entities in the searched database(s). For computing the weight, a normalized database schema may be considered in order to minimize data redundancy and inconsistencies. The E-R diagram may be converted into a directed weighted semantic graph "G" where G=<E, R, W>, where E are nodes representing entities, R are edges representing relationships between any two entities, and W represents the weights of a given entity-relationship pair. In such an embodiment, W=g×c, where global weight "g" represents the general importance of a particular type of entity to the dataset as a whole. Although an approximation of g may be computed automatically by counting the number of relations in which each entity type participates, results which are better targeted to specific tasks may be achieved by allowing a domain expert to manually establish such weights. Betweenness centrality "c" of an entity is a measure of the entity's centrality in the graph (e.g., the entity's importance to the graph as a whole). The betweenness centrality c of a given entity node v is given by:

$$c = \sum_{s \ne v \ne t} \frac{\sigma_{st}(v)}{\sigma_{st}}$$

Where $\sigma_{st}$ is the total number of shortest paths from entity node s to entity node t and $\sigma_{st}(v)$ is the number of those paths that pass through entity node v.

The combined g×c score may be used to determine the weight or relevance of each individual entity node to the complete graph. This weighting algorithm may be generalized to any normalized relational database as illustrated in example embodiments provided below.

Example embodiments of the present invention may be implemented with respect to a search of a database where a user is searching for a particular entity. The sought entity may be referred to as the "root entity" which may be obtained through a keyword search or similar. The root entity may also be an entity that is known to a user and the user is looking for information in the database related to the known root entity. In such an embodiment, the user may select the root entity and embodiments of the present invention may present entities related to the root entity to the user. As such, the "search" may be to obtain a root entity and results related there to, or it may be a search conducted using the root entity to find related entities.

The Internet Movie Database (IMDb; www.imdb.com) is an example embodiment of a relational database available via a network (e.g., the Internet) comprising a database of information related to movies, television shows, actors, production crew personnel, video games, and fictional characters featured in visual entertainment media. The database is ever increasing in size as media proliferates through the ubiquity of content providers and available resources.

Due to the centrality of the movie entities in the database, an E-R diagram may have a relation between the movie entity and every other entity in the database. In such an example, the "betweenness centrality" of the movie entities would be high. Examples of such basic relationships between entities within the IMDb may include "directed" or "acted in" where the entities connected by these relationships are people. Hence, weights may be computed for relationships between movie entities M and people entities P. The people entities may include actors, directors, producers, writers, etc.

Applying the above described weighting algorithm to the IMDb schema, global weight for the movie entity $g_m$, is the normalized product of the attributes: user rating, awards received, and gross revenue earned.

$$g_m = \text{normalize(rating)} \times \text{normalize(awards)} \times \text{normalize(revenue)}$$

The global weight for the people entity $g_p$, may be the normalized product of the attributes: casting order (i.e., how important a casting role the entity has; for example, a lead actor is deemed of greater importance than a supporting actor role), and awards received.

$$g_p = \text{normalize(casting\_order)} \times \text{normalize(awards)}$$

The centrality weights $c_m$ and $c_p$, for movie and people entities respectively, can then be computed as above, based on the nature of movie-people relationships that exist in the database. As illustrated by the example embodiment of the IMDb, the weight algorithm may be database specific. Generic weighting algorithms may be used; however, the weights generated by such generic algorithms may not prove as useful or meaningful to users searching the database.

A graph of the IMDb example may include "A" as the central node or "root entity" that represents the query from the IMDb search itself, such as an actor or a movie. As this root entity is the node that the user is interested in, the "A" node may be included in the visualization. In order to determine which of the many entity nodes are connected to A to include in the visualization, the global weights (either $g_m$ or $g_p$, depending on if A is a movie or a person entity) for each node may be computed. The centrality weight c, between entity A and each of these nodes may also be computed. The final weight W may then be used to determine a ranked list of connected entities to A.

Embodiments of the present invention provide a mechanism for providing a visual grouping of related entities from a database. The visual grouping provides an interface for a user to browse within a graph that is defined by the database's entity relationships. As described above, databases can be large and include a great deal of information such that displaying useful overviews of them on a display can be challenging, particularly when the display is that of a portable device. Described herein are mechanisms to view an approximate locality of concern (e.g., a relevant portion of the relational database) and browsing within the approximate locality to find the specific result sought.

Providing a visual interface with the search results may provide a user with an intuitive mechanism in which they may browse or sort through search results in order to find the specific information sought. Entities of the locality of concern within the database may be presented in a number of ways to provide a graphical representation of each entity. One representation may include the presentation of a tile which represents the entity. Tiles may provide a graphical representation of the information or entity with which they are associated. Tiles, according to example embodiments, may be used to represent information, data, applications, or any entity that may be within a database or be the subject of a search. In the above example of the IMDb, tiles may provide graphical representations of movies or people through images depicting the movie (e.g., a movie poster image, a screen capture from the movie, a movie clip, etc.) or images depicting the person (e.g., a head shot, a text name within the tile, etc.). The tile may include a still image or it may include a video (e.g., a series of pictures).

Figure 3:
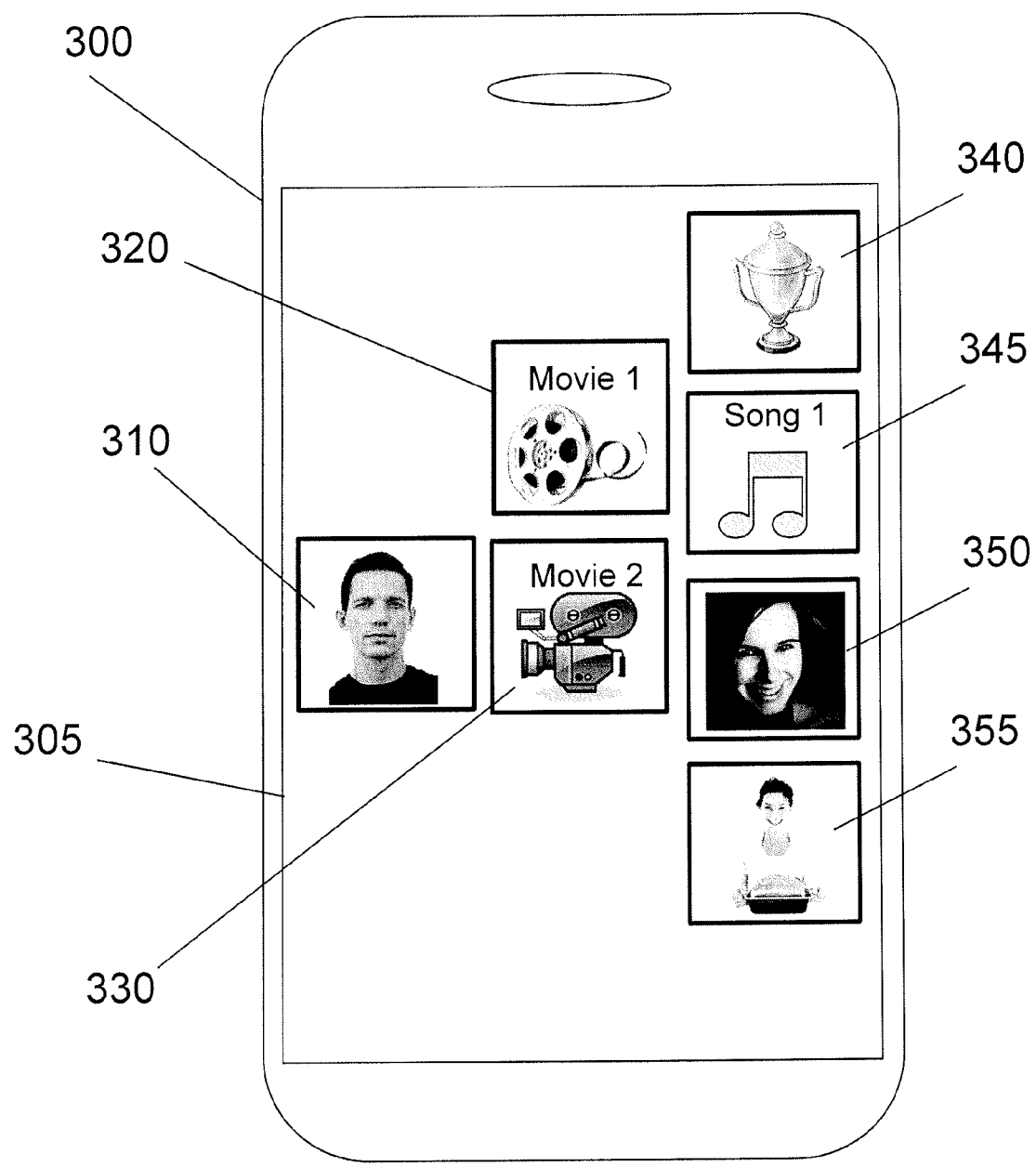
FIG. 3 illustrates a device displaying a locality of a database according to an example embodiment of the present invention.

FIG. 3 illustrates an example embodiment of a device 300, such as apparatus 50, presenting entities 310, 320, 330 on a display 305, where the entities are represented by tiles. In the illustrated embodiment, the entities may be people, such as entity 310 depicting an actor, or the entities may be movies, such as entities 320, 330. In the illustrated embodiment, the searched for entity or root entity is represented by entity 310, depicting an actor. The entities may provide other information to a user which may be specifically related to the information sought in the search or related to the database which was searched. The display 305 depicts the locality of the database including information entities related to the root entity. For example, in the embodiment of the IMDb, presentation of entities 320 and 330 in response to a search may suggest or indicate a relationship with the root entity 310. The tiles representing the entities may provide additional information by virtue of the icons or images depicted in the tile. For example, the icon or image of entity 320 may indicate that the root entity 310 is an actor in the movie of entity 320. The icon of entity 330 may indicate that the root entity 310 is a director of the movie of entity 330.

According to example embodiments, the tiles may also present more detailed information about the entity to which they are related. Optionally, a user may select an entity to call up more detailed information of the entity. For example, selecting the root entity 310 depicting an actor may provide date of birth, place of birth, biography, awards, etc. Selecting the entity of a movie may provide cast and crew information, a movie synopsis, awards, genre, etc.

The presentation of entities on a display, such as display 68 of apparatus 50, may be indicative of their relationship with a root entity. The graphical presentation of entities according to their relationships with the root entity may provide a user a visual cue as to the relationships among entities within the database that are relevant to the root entity. Entities may be presented with the root entity 310 presented in a prominent location, such as root entity 310 of FIG. 3 where the root entity 310 is presented on the left side of the display in the center. Entities that are one relationship away (e.g., a primary relationship or directly related) from the root entity may be found adjacent to the root entity 310, such as entities 320, 330. Entities that are two relationships (e.g., a secondary relationship or indirectly related) away may be further removed from the root entity, such as on the right side of the display, two "steps" away from the root entity 310, such as entities 340, 345, 350, 355. A primary relationship may be a relationship with the root entity absent any intermediate entities while a secondary relationship may be a relationship with the root entity by way of a relationship with an entity with a primary relationship with the root entity.

In the illustrated embodiment of FIG. 3, entity 340 may represent an award that was won by an actor (other than the actor represented by entity 310) of the movie represented by entity 320. As the actor of root entity 310 did not win the award, but rather another actor did for work in the movie of entity 320 that both actors were in, the award may have a secondary relationship with the actor of root entity 310 versus a primary relationship between the actor of entity 310 and the movie of entity 320.

While the embodiment illustrated in the example of FIG. 3 depicts three columns including two levels of relationships with the root entity, smaller entities or larger displays may permit more levels of relationships to be displayed. In some cases, the relationship "branching factor" may be extensive (e.g., many relationships and 3rd 4th, $5^{th}$ . . . degree relationships, etc.) which may make it impractical to display all related entities. Further, there may be more entities with primary relationships and secondary relationships with the root entity than can be presented on the display 305. In the illustrated embodiment of FIG. 4, arrows 360, 365, 370, 375 are illustrated to indicate that additional entities with primary relationships (such as entity 320) are in the database, but not visible on the display 305. The user may scroll vertically using arrow 360 or 370 to view more entities with primary relationships with the root entity 310. Similarly, the arrows 365, 375 indicate that there are more entities with secondary relationships with the root entity 310 than entities 340, 345, 350, 355 represent. As such, the depicted entities of column 380 may be a subset of the plurality of entities with a primary relationship with the root entity 310. The depicted entities of column 390 may be a subset of the plurality of entities with a secondary relationship with the root entity 310.

As there may be a plethora of entities with primary, secondary, or further distant relationships with the root entity and as there may be limited display space on which to present these entities, it may be desirable to have a mechanism to determine which subset of the plurality of entities are represented in the initial view in response to the search. An algorithm may be used to determine which entities are to be presented. For example, an algorithm may order entities based upon the frequency of access (e.g., how often that entity is accessed by users of the database), however, an algorithm specific to the searched domain may be most effective as the subject matter of each domain searched may be unique or incompatible with the subject matter of other domains (e.g., a social networking profile database versus a music library database). Further, the weighting algorithm outlined above may be used to determine which primary relationships are the most significant, which secondary relationships are the most significant, etc. In such an embodiment, the entities with the highest weighted relationships may be presented first as a first subset of the plurality of entities with a primary relationship (or secondary relationship) and subsequent entities having lower weights may be available via scrolling from the highest weight to the lowest weight.

Example embodiments may provide a mechanism for interacting with the displayed locality of the database. For example, in the displayed locality of FIG. 4, a user may wish to change the entity that is presented as the root entity 310. A user may select the entity 320 representing "Movie 1" as the root entity such that the original root entity, represented by entity 310, is then moved to the primary relationship column where "Movie 1" previously resided. Such interaction may allow exploration of localities within a database.

Figure 4:
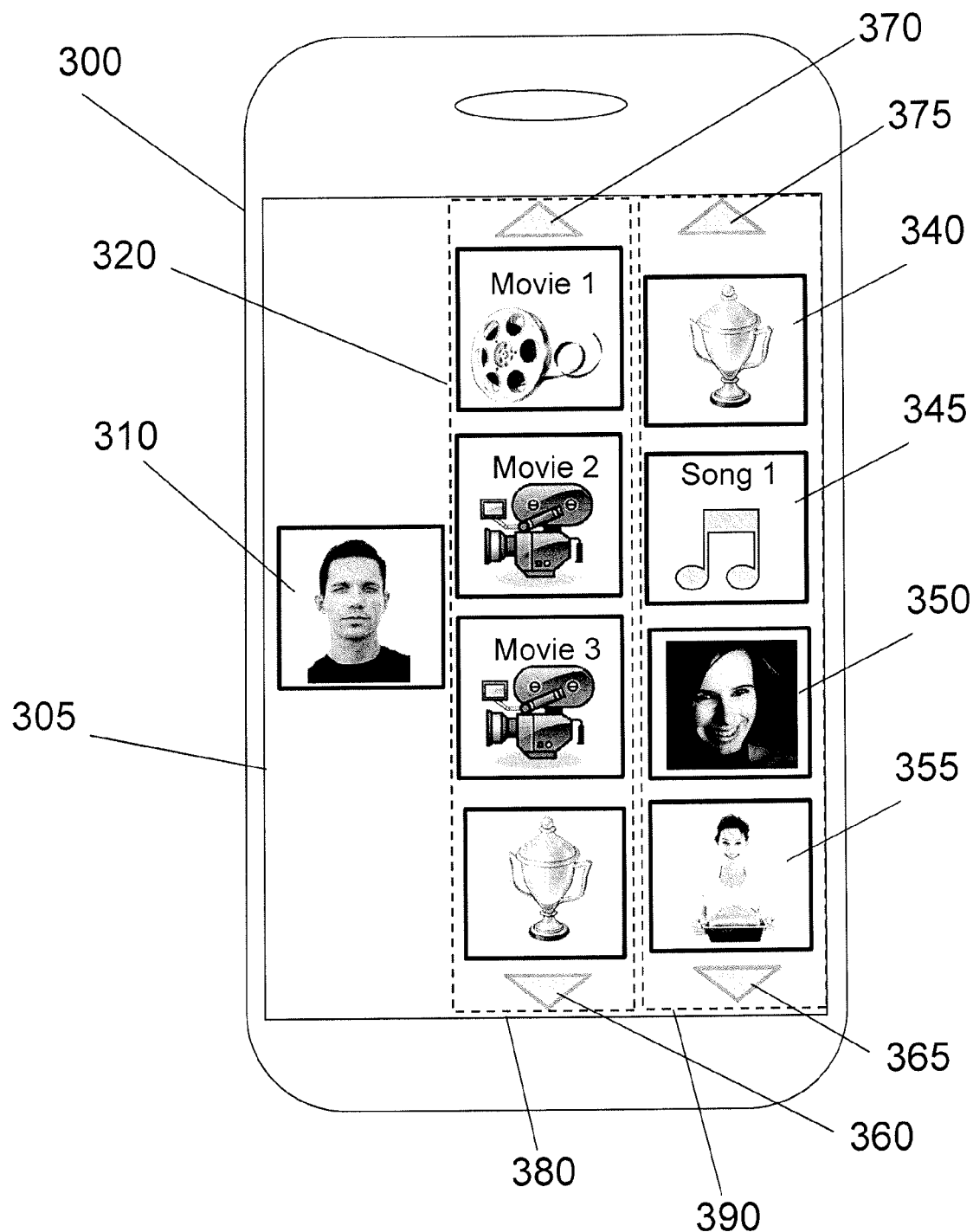
FIG. 4 illustrates a device displaying a locality of a database according to another example embodiment of the present invention.

According to the embodiments of FIGS. 3 and 4, the position of the entities relative to the root entity provides a visual indicator of the degree of relationships (e.g., primary, secondary, etc.). The root entity 310 is directly related to every entity depicted in the middle column 380 (e.g., the first subset of the plurality of entities with a primary relationship) and indirectly related to every entity in the rightmost column 390 (e.g., the first subset of the plurality of entities with a secondary relationship). However, the visual indicator of the degree of relationships does not indicate which entities in the middle column 380 and the rightmost column 390 are related to one another, nor how entities in the rightmost column are related to the root entity 310. Further visual indications are needed to reveal such relationship detail. While the depicted embodiment shows a subset of the plurality of entities with a primary relationship with the root entity and a subset of the plurality of entities with a secondary relationship with the root entity in adjacent columns, the subsets may be presented in any appropriate manner depicting their relevance. For example, the root entity may be displayed in the center of the display 305 while the subset of the plurality of entities with a primary relationship with the root entity may be depicted in a circle about the root entity. The subset of the plurality of entities with a secondary relationship with the root entity may be displayed in a circle around the circle depicting the subset of the plurality of entities with a primary relationship with the root entity. Such concentric circles may extend outwardly as the relationships become more indirect (e.g., tertiary relationships, etc.).

An example embodiment of a mechanism for indicating relationships between entities in the middle column 380 and the rightmost column 390 may include where entities are only displayed when they have relationships with entities displayed on the screen. For example, as a user may use arrow 360 to scroll through subsets of entities of the middle column 380, the subset of entities displayed in the rightmost column 390 changes according to the entities displayed in the middle column. If a secondary relationship entity of the rightmost column does not have a relationship with any of the entities in the middle column, it may not be displayed. Optionally, a change in the subset of entities displayed with a primary relationship with the root entity may not change the subset of entities displayed with a secondary relationship with the root entity.

Figure 5:
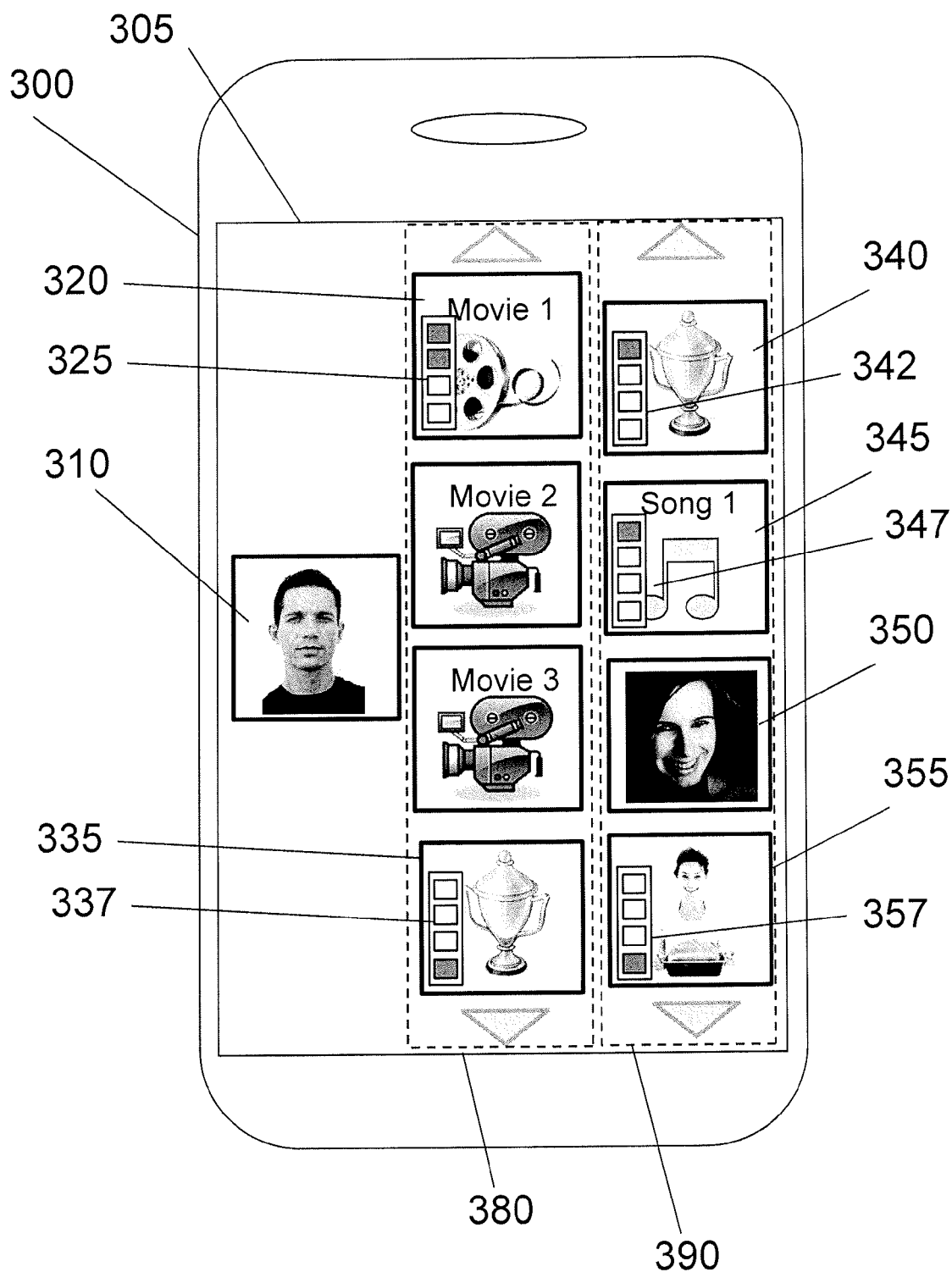
FIG. 5 illustrates a device displaying a locality of a database and illustrating relationships between information entities within the locality according to an example embodiment of the present invention.

Another example embodiment of a mechanism for indicating relationships between entities in the middle column 380 and the rightmost column 390 is illustrated in FIG. 5. An indicator comprising an icon is depicted in each entity that is related to at least one other entity presented on the display. Each icon illustrates a position of an entity of an adjacent column to which it is related. For example, entity 335 includes icon 337 which depicts four entities in which the bottom most is differentiated from the others by shading. The shaded entity in the icon 337 indicates that entity 335 is related to the entity in the shaded position in the adjacent column 390. Thus, entity 335 is related to entity 355. Similarly, entity 355 includes an icon 357 with an entity shaded in the location of entity 335. Entity 320 includes an icon 325 with two shaded entity representations. Those two shaded entity representations of icon 325 correspond to entities 340 and 345. Each of entities 340 and 345 include icons (342 and 347 respectively) which indicate that they are related to entity 320. This example embodiment for illustrating relationships between entities in columns may be referred to as "positional similarity."

Further example embodiments of indicating relationships between entities may include an entity border color. For example, using the example embodiment of FIG. 5, entity 320 may include a border that is red. Each of entities 340 and 345 would then also include a border that is colored red. If an entity has multiple relationships with entities in adjacent columns, the border could be broken into several colors corresponding to the border colors of entities that are related.

Additional example embodiments of indicating relationships between entities may include an indication where each entity is assigned a color and that color is illustrated as a border for that entity. Entities related to other entities may comprise an indication within the entity of the color assigned to the entity to which they are related. For example, entity A may include a red border and entity B may include a yellow border. If entities A and B are related, entity A may comprise a yellow indication, such as a yellow box or circle within the representation of entity A and entity B may comprise a red indication within the representation of entity B.

Another example embodiment of indicating relationships between entities may comprise providing for display of an indication comprising a small representation of a related entity to illustrate the relationship. Referring again to the example embodiment of FIG. 5, entity 320 may depict indications which comprise small representations of entities 340 and 345 within entity 320 or in proximity to entity 320 to demonstrate their relationship. The small representations of entities 340 and 345 may be positioned within entity 320 and may be depicted in a location within entity 320 that illustrates a location relative to entity 320. For example, an indication comprising a small representation of entity 340 may appear in the top right corner of entity 320 as entity 340 is situated in the top right of the display 305, to the right of entity 320.

FIG. 6 depicts another example embodiment of illustrating the relationships between entities in a locality of a database. In the illustrated example, the indication demonstrating the connectedness or relationships between entities are illustrated as connectors. The connector 392 provides an indication of a relationship between the entities 335 and 355. Connector 394 provides an indication of a relationship between the entities 320 and 345. Connector 396 provides an indication of a relationship between the entities 320 and 340. While connectors 392, 394, and 396 are depicted as lines, any such connector providing a visual cue of the relationship between entities may be provided for display, such as an arc, a serpentine line, etc. Another example embodiment of an indication of a relationship between entities may include providing for display of the name of a related entity within the entity to which it is related. For example, in the embodiment of FIG. 6, the name "Movie 1" may be provided for display on entity 340 indicating a relationship between entity 340 and entity 320.

FIG. 7 is a flowchart of a method and program product according to an example embodiment of the invention. It will be understood that each block of the flowchart, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

An example embodiment of the invention may provide a method for indicating relationships between entities. The method of the example embodiment may include identifying a plurality of entities with a primary relationship with a root entity at operation 600, which may be performed, for example, by an apparatus and, more particularly, by a processor. In one embodiment, the apparatus, such as apparatus 50 of FIG. 2, may include means, such as processor 70, for performing the operations of the method. The method of example embodiments may further identify a plurality of entities with a secondary relationship with the root entity at 610. The apparatus, such as the processor, may identify the plurality of entities with a secondary relationship with the root entity. For example, the apparatus of one embodiment may include means, such as the processor 70, for identifying the plurality of entities with a secondary relationship with the root entity.

At 620, the method may provide for display of the root entity, a subset of the plurality of entities with a primary relationship with the root entity, and a subset of the plurality of entities with a secondary relationship with the root entity. The method may further include providing for display of an indication that the first subset, of the plurality of entities with a primary relationship with the root entity, has a primary relationship with the root entity at 630. The apparatus, and more particularly, the processor 70, the user interface 72, or the like, may provide for the display at 620 and 630. For example, the apparatus of one embodiment may include means, such as the processor, the user interface, or the like for providing for display.

At 640, the method may provide for an indication that the first subset, of the plurality of entities with a secondary relationship with the root entity, has a secondary relationship with the root entity. A method may still further provide for display of an indication of a relationship between at least one entity of the first subset of the plurality of entities with a primary relationship with the root entity, and at least one entity, of the first subset of the plurality of entities with a secondary relationship with the root entity as shown in operation 650. The apparatus and, more specifically, the processor, the user interface, or the like, may provide for an indication in 640 and 650. In one embodiment, the apparatus may include means, such as the processor or the user interface, for providing for display of the indications of operations 640 and 650.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. With reference to the operations of FIG. 7, in some example embodiments, the method may include providing for display of a connector as the indication of a relationship between the at least one entity, of the first subset of the plurality of entities with a primary relationship with the root entity, and the at least one entity, of the first subset of entities with a secondary relationship with the root entity. Such an operation may be performed by the processor and/or the user interface and, in one embodiment, by means, such as the processor 70, the user interface 72, or the like. A method may include providing for display of an indication of a relationship between at least one entity, of the first subset of the plurality of entities with a primary relationship with the root entity, and at least one entity, of the first subset of the plurality of entities with a secondary relationship with the root entity. The method may further provide for display of an icon proximate a first entity of the first subset of the plurality of entities with a primary relationship with the root entity. The icon of this embodiment may include a representation of the first subset of the plurality of entities with a secondary relationship with the root entity, and the icon of this embodiment may distinguish the location of entities within the representation of the first subset of the plurality of entities with a secondary relationship with the root entity, that are related to the first entity.

In some embodiments, a method may include providing for display of the root entity, a second subset of the plurality of entities with a primary relationship with the root entity, and the first subset of the plurality of entities with a secondary relationship with the root entity. In this embodiment, the second subset, of the plurality of entities with a primary relationship with the root entity may be displayed in response to a user input. The method may further provide for display of an indication of a relationship between at least one entity of the second subset of the plurality of entities with a primary relationship with the root entity, and at least one entity, of the first subset of the plurality of entities with a secondary relationship with the root entity. Such operations may be performed by the processor and/or the user interface and, in one embodiment, by means, such as the processor 70, the user interface 72, or the like of apparatus 50.

In some embodiments, the method may include replacing the first subset, of the plurality of entities with a secondary relationship with the root entity, with a second subset, of the plurality of entities with a secondary relationship with the root entity, in response to a user input. The method of this embodiment may also include replacing the indication of a relationship between at least one entity, of the first subset of the plurality of entities with a primary relationship with the root entity, and at least one entity, of the first subset of the plurality of entities with a secondary relationship with the root entity, with an indication of a relationship between at least one entity of the first subset of the plurality of entities with a primary relationship with the root entity, and at least one entity, of the second subset of the plurality of entities with a secondary relationship with the root entity. For example, the first subset of the plurality of entities with a secondary relationship with the root entity may be scrolled, or otherwise changed such that a second subset of the plurality of entities with a secondary relationship with the root entity is displayed. In response to this, the indication of a relationship between at least one of the first subset of the plurality of entities with a primary relationship with the root entity to one of the first subset of the plurality of entities with a secondary relationship with the root entity may be replaced by an indication of a relationship between the at least one of the first subset of the plurality of entities with a primary relationship with the root entity and one of the second subset of the plurality of entities with a secondary relationship with the root entity.

In some embodiments, the provision of a display of an indication that the first subset, of the plurality of entities with a primary relationship with the root entity, has a primary relationship with the root entity, may include providing for display of the first subset of the plurality of entities, with a primary relationship with the root entity, in a first area of the display. In this embodiment, the provision of a display of an indication that the first subset, of the plurality of entities with a secondary relationship with the root entity has a secondary relationship with the root entity may include providing for display of the first subset, of the plurality of entities with a secondary relationship with the root entity, in a second area of the display. The first area of the display may be located between the second area of the display and the root entity.

As indicated above, an apparatus for performing the method of FIG. 7 above may comprise a processor (e.g., the processor 70) configured to perform some or each of the operations (600-650) described above. The processor 70 may, for example, be configured to perform the operations (600-650) by performing hardware implemented logical functions, executing stored instructions, or executing algorithms for performing each of the operations. Alternatively, the apparatus may comprise means, such as the processor or the like, for performing each of the operations described above.

An example of an apparatus according to an example embodiment may include at least one processor and at least one memory including computer program code. The at least one memory and the computer program code may be configured to, with the at least one processor, cause the apparatus to perform the operations 600-650 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 600-650 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    identifying a plurality of entities with a primary relationship with a root entity;
    identifying a plurality of entities with a secondary relationship with the root entity;
    displaying of a visual representation of the root entity, a first subset of the plurality of entities with a primary relationship with the root entity, and a first subset of the plurality of entities with a secondary relationship with the root entity;
    displaying of a visual indication that the first subset, of the plurality of entities with a primary relationship with the root entity, has a primary relationship with the root entity;
    displaying of a visual indication that the first subset, of the plurality of entities with a secondary relationship with the root entity, has a secondary relationship with the root entity; and
    displaying of a graphical depiction indicating a relationship between at least one entity of the first subset of the plurality of entities with a primary relationship with the root entity, and at least one entity, of the first subset of the plurality of entities with a secondary relationship with the root entity.

2. The method of claim 1, wherein the graphical depiction indicating the relationship between the at least one entity, of the first subset of the plurality of entities with a primary relationship with the root entity, and the at least one entity, of the first subset of entities with a secondary relationship with the root entity, comprises a connector.

3. The method of claim 1, wherein display of the graphical depiction indicating the relationship between at least one entity, of the first subset of the plurality of entities with a primary relationship with the root entity, and at least one entity, of the first subset of the plurality of entities with a secondary relationship with the root entity, comprises:
    display of an icon proximate a first entity of the first subset of the plurality of entities with a primary relationship with the root entity,
    wherein the icon comprises a representation of the first subset of the plurality of entities with a secondary relationship with the root entity, and
    wherein the icon distinguishes the location of entities, within the representation of the first subset of the plurality of entities with a secondary relationship with the root entity, that are related to the first entity.

4. The method of claim 1, further comprising:
    display of the root entity, a second subset of the plurality of entities with a primary relationship with the root entity, and the first subset of the plurality of entities with a secondary relationship with the root entity, wherein the second subset, of the plurality of entities with a primary relationship with the root entity, is displayed in response to a user input, and
    display of graphical depiction indicating a relationship between at least one entity, of the second subset of the plurality of entities with a primary relationship with the root entity, and at least one entity, of the first subset of the plurality of entities with a secondary relationship with the root entity.

5. The method of claim 1, further comprising:
replacing the first subset, of the plurality of entities with a secondary relationship with the root entity, with a second subset, of the plurality of entities with a secondary relationship with the root entity, in response to a user input; and
replacing the graphical depiction indicating a relationship between at least one entity, of the first subset of the plurality of entities with a primary relationship with the root entity, and at least one entity, of the first subset of the plurality of entities with a secondary relationship with the root entity, with graphical depiction indicating a relationship between at least one entity, of the first subset of the plurality of entities with a primary relationship with the root entity, and at least one entity, of the second subset of the plurality of entities with a secondary relationship with the root entity.

6. The method of claim 1, wherein display of the indication that the first subset, of the plurality of entities with a primary relationship with the root entity has a primary relationship with the root entity, comprises display of the first subset, of the plurality of entities with a primary relationship with the root entity, in a first area of a display, and
wherein display of the indication that the first subset, of the plurality of entities, with a secondary relationship with the root entity, has a secondary relationship with the root entity comprises display of the first subset, of the plurality of entities with a secondary relationship with the root entity, in a second area of a display.

7. The method of claim 6, wherein the first area of the display is positioned between the second area of the display and the root entity.

8. An apparatus comprising at least one processor and at least one memory including computer program code, the at least one memory and the computer program code configured to, with the at least one processor, cause the apparatus to:
identify a plurality of entities with a primary relationship with a root entity;
identify a plurality of entities with a secondary relationship with the root entity;
display a visual representation of the root entity, a first subset of the plurality of entities with a primary relationship with the root entity, and a first subset of the plurality of entities with a secondary relationship with the root entity;
display a visual indication that the first subset, of the plurality of entities with a primary relationship with the root entity, has a primary relationship with the root entity;
display a visual indication that the first subset, of the plurality of entities with a secondary relationship with the root entity, has a secondary relationship with the root entity; and
display a graphical depiction indicating a relationship between at least one entity of the first subset of the plurality of entities with a primary relationship with the root entity, and at least one entity of the first subset of the plurality of entities with a secondary relationship with the root entity.

9. The apparatus of claim 8, wherein the graphical depiction indicating the relationship between the at least one entity, of the first subset of the plurality of entities with a primary relationship with the root entity, and the at least one entity, of the first subset of entities with a secondary relationship with the root entity, comprises a connector.

10. The apparatus of claim 8, wherein causing the apparatus to display of the graphical depiction indicating the relationship between at least one entity, of the first subset of the plurality of entities with a primary relationship with the root entity, and at least one entity, of the first subset of the plurality of entities with a secondary relationship with the root entity, comprises causing the apparatus to:
display an icon proximate a first entity of the first subset of the plurality of entities with a primary relationship with the root entity,
wherein the icon comprises a representation of the first subset of the plurality of entities with a secondary relationship with the root entity, and
wherein the icon distinguishes the location of entities, within the representation of the first subset of the plurality of entities with a secondary relationship with the root entity, that are related to the first entity.

11. The apparatus of claim 8, wherein the apparatus is further caused to:
display the root entity, a second subset of the plurality of entities with a primary relationship with the root entity, and the first subset of the plurality of entities with a secondary relationship with the root entity, wherein the second subset, of the plurality of entities with a primary relationship with the root entity, is displayed in response to a user input, and
display an graphical depiction indicating a relationship between at least one entity, of the second subset of the plurality of entities with a primary relationship with the root entity, and at least one entity, of the first subset of the plurality of entities with a secondary relationship with the root entity.

12. The apparatus of claim 8, wherein the apparatus is further caused to:
replace the first subset, of the plurality of entities with a secondary relationship with the root entity, with a second subset, of the plurality of entities with a secondary relationship with the root entity, in response to a user input; and
replace the graphical depiction indicating a relationship between at least one entity, of the first subset of the plurality of entities with a primary relationship with the root entity, and at least one entity, of the first subset of the plurality of entities with a secondary relationship with the root entity, with graphical depiction indicating a relationship between at least one entity, of the first subset of the plurality of entities with a primary relationship with the root entity, and at least one entity, of the second subset of the plurality of entities with a secondary relationship with the root entity.

13. The apparatus of claim 8, wherein causing the apparatus to display of the indication that the first subset, of the plurality of entities with a primary relationship with the root entity has a primary relationship with the root entity, comprises causing the apparatus to provide for display of the first subset, of the plurality of entities with a primary relationship with the root entity, in a first area of a display, and
wherein causing the apparatus to display of the indication that the first subset, of the plurality of entities with a secondary relationship with the root entity, has a secondary relationship with the root entity comprises causing the apparatus to display of the first subset, of the plurality of entities with a secondary relationship with the root entity, in a second area of a display.

14. The apparatus of claim 13, wherein the first area of the display is positioned between the second area of the display and the root entity.

15. A computer program product comprising at least one non-transitory computer-readable storage medium having computer executable program code instructions stored therein, the computer executable program code instructions comprising:

program code instructions for identifying a plurality of entities with a primary relationship with a root entity;

program code instructions for identifying a plurality of entities with a secondary relationship with the root entity;

program code instructions for displaying of a visual representation of the root entity, a first subset of the plurality of entities with a primary relationship with the root entity, and a first subset of the plurality of entities with a secondary relationship with the root entity;

program code instructions for displaying of a visual indication that the first subset, of the plurality of entities with a primary relationship with the root entity, has a primary relationship with the root entity;

program code instructions for displaying of a visual indication that the first subset, of the plurality of entities with a secondary relationship with the root entity, has a secondary relationship with the root entity; and program code instructions for displaying of a graphical depiction indicating a relationship between at least one entity of the first subset of the plurality of entities with a primary relationship with the root entity, and at least one entity of the first subset of the plurality of entities with a secondary relationship with the root entity.

16. The computer program product of claim 15, wherein the graphical depiction indicating the relationship between the at least one entity, of the first subset of the plurality of entities with a primary relationship with the root entity, and the at least one entity, of the first subset of entities with a secondary relationship with the root entity, comprises a connector.

17. The computer program product of claim 15, wherein the program code instructions for display of the graphical depiction indicating the relationship between at least one entity, of the first subset of the plurality of entities with a primary relationship with the root entity, and at least one entity, of the first subset of the plurality of entities with a secondary relationship with the root entity, comprises:

program code instructions for display of an icon proximate a first entity of the first subset of the plurality of entities with a primary relationship with the root entity, wherein the icon comprises a representation of the first subset of the plurality of entities with a secondary relationship with the root entity, and wherein the icon distinguishes the location of entities, within the representation of the first subset of the plurality of entities with a secondary relationship with the root entity, that are related to the first entity.

18. The computer program product of claim 15, further comprising:

program code instructions for display of the root entity, a second subset of the plurality of entities with a primary relationship with the root entity, and the first subset of the plurality of entities with a secondary relationship with the root entity, wherein the second subset, of the plurality of entities with a primary relationship with the root entity, is displayed in response to a user input, and program code instructions for display of graphical depiction indicating a relationship between at least one entity, of the second subset of the plurality of entities with a primary relationship with the root entity, and at least one entity, of the first subset of the plurality of entities with a secondary relationship with the root entity.

19. The computer program product of claim 15, further comprising:

program code instructions for replacing the first subset, of the plurality of entities with a secondary relationship with the root entity, with a second subset, of the plurality of entities with a secondary relationship with the root entity, in response to a user input; and program code instructions for replacing the graphical depiction indicating a relationship between at least one entity, of the first subset of the plurality of entities with a primary relationship with the root entity, and at least one entity, of the first subset of the plurality of entities with a secondary relationship with the root entity, with graphical depiction indicating a relationship between at least one entity, of the first subset of the plurality of entities with a primary relationship with the root entity, and at least one entity, of the second subset of the plurality of entities with a secondary relationship with the root entity.

20. The computer program product of claim 15, wherein the program code instructions for display of the indication that the first subset, of the plurality of entities with a primary relationship with the root entity has a primary relationship with the root entity, comprises program code instructions for display of the first subset, of the plurality of entities with a primary relationship with the root entity, in a first area of a display, and wherein the program code instructions for display of the indication that the first subset, of the plurality of entities with a secondary relationship with the root entity, has a secondary relationship with the root entity comprises program code instructions for display of the first subset, of the plurality of entities with a secondary relationship with the root entity, in a second area of a display.

* * * * *